United States Patent [19]
Roginson

[11] 3,911,673
[45] Oct. 14, 1975

[54] V.T.O.L. ENGINE WITH VERTICAL THRUST CONTROL

[76] Inventor: Richard Roginson, 4194 Tonawanda Creek Road, North Tonawanda, N.Y. 14120

[22] Filed: Mar. 11, 1974

[21] Appl. No.: 450,180

[52] U.S. Cl. .................. 60/229; 60/230; 244/23 B; 244/23 D
[51] Int. Cl.[2]... F02K 1/00; F02K 1/20; B64C 29/00
[58] Field of Search ..................... 60/229, 230, 232; 239/265.19; 244/23 R, 23 A, 23 B, 23 D

[56] References Cited
UNITED STATES PATENTS

| | | | |
|---|---|---|---|
| 3,130,543 | 4/1964 | Oldfield et al. ...................... | 60/229 |
| 3,206,929 | 9/1965 | Marchant et al. ................ | 60/229 X |
| 3,281,082 | 10/1966 | Kerry ..................................... | 244/23 |
| 3,450,348 | 6/1969 | Kopp ............................... | 60/232 X |

*Primary Examiner*—C. J. Husar
*Assistant Examiner*—Thomas I. Ross
*Attorney, Agent, or Firm*—Ashlan F. Harlan, Jr.

[57] ABSTRACT

This device consists primarily of a base portion supporting a jet having a large gate valve which is operable by gear means engaging both an electric motor and a compressed air motor, the base portion of the device having electric and compressed air motor means and gear means for rotating a collar, the base also having spaced apart moveable fins which are rotated by rack and gear means of electric motor means and compressed air motor means.

2 Claims, 4 Drawing Figures

V.T.O.L. ENGINE WITH VERTICAL THRUST CONTROL

This invention relates to jet engines, and more particularly to a duo jet engine.

It is therefore the principal object of this invention to provide a duo jet engine which will have a large gate valve controllable by electric and compressed air means so that, on take off the jet blast on the V.T.O.L. plane is downwards and when the craft reaches altitude, the gate valve will be opened by the electric or compressed air motor means, thus enabling the jet stream to go rearwardly so as to urge the craft forward by the thrust.

Another object of this invention is to provide a jet engine which has compressed air and electric motor means which will be used to activate the collar and fins for control in landing the craft.

A further object of this invention is to provide a jet engine of the type described which will utilize the compressed air motor means as a back-up system for control.

Other objects of the invention are to provide a jet engine which is simple in design, inexpensive to manufacture, rugged in construction, easy to use and efficient in operation.

These and other objects will be readily evident upon a study of the following specification and the accompanying drawings, wherein.

Figure 1:
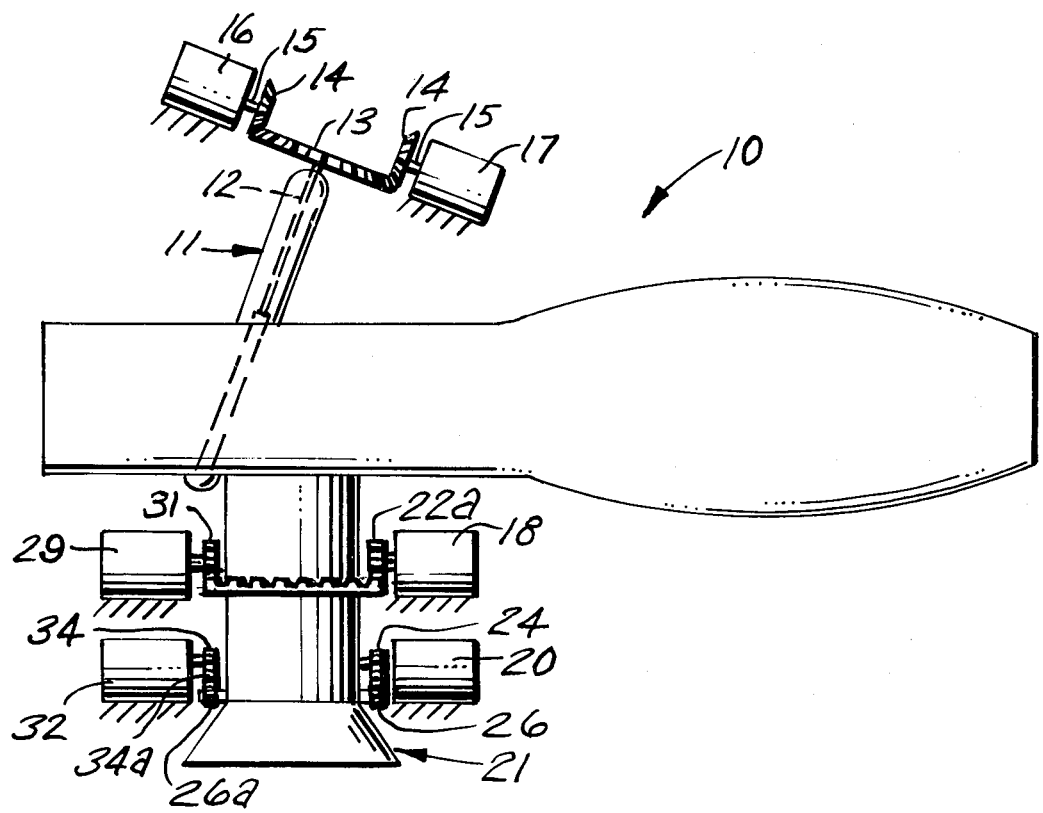
FIG. 1 is a diagrammatic side view of the present invention shown in elevation.
Figure 2:
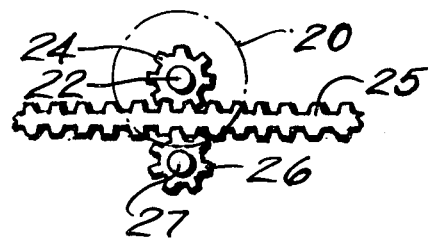
FIG. 2 is a detail view taken along the line 2—2 of FIG. 4.
Figure 3:
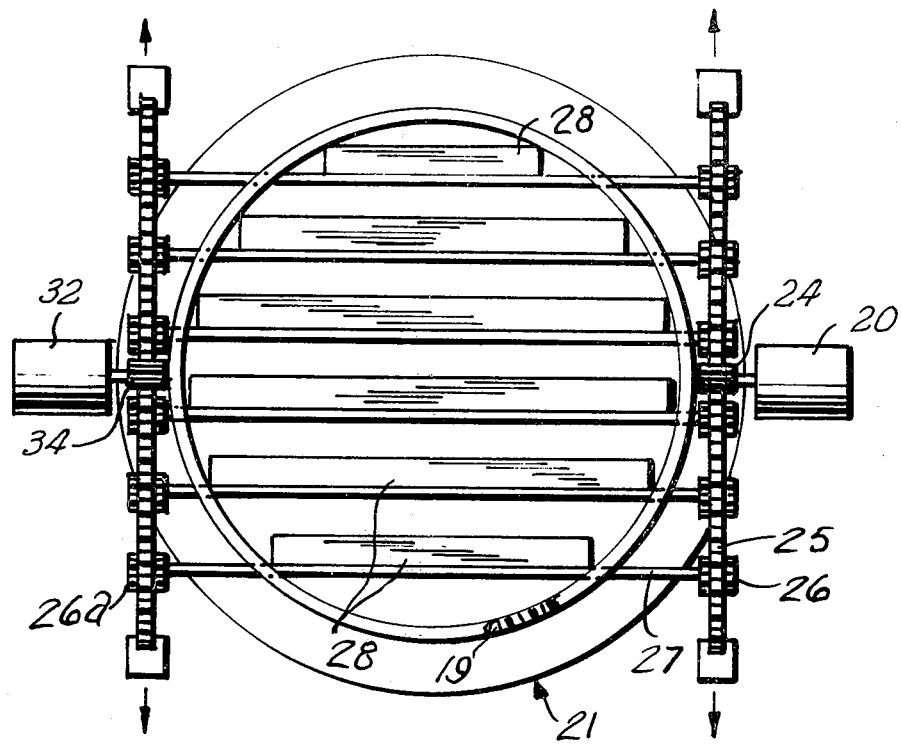
FIG. 3 is an enlarged transverse sectional view showing the vanes or fins of the base portion of the device.
Figure 4:
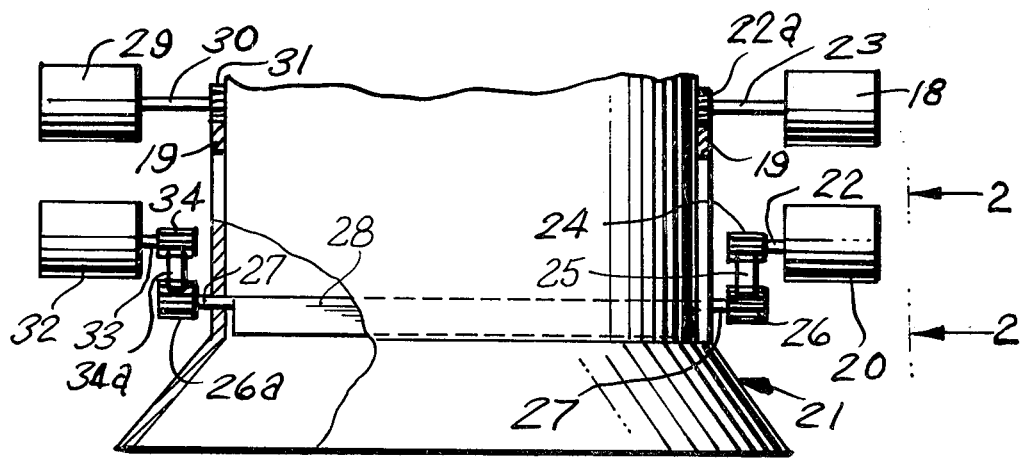
FIG. 4 is an enlarged fragmentary side view of the invention with a portion broken away.

According to this invention, a duo jet engine 10 is shown to include an angularly positioned large gate valve 11, the shaft 12 of which is secured fixedly to a bevel gear 13 which is in meshing engagement with gears 14 on the shafts 15 of compressed air motor 16 and electric motor 17. An electric motor 18 provides for the rotation of a toothed collar 19 rotatably carried on the base 21 of said engine and an electric motor 20 near the bottom of the base 21 is provided with a shaft 22 beneath the shaft 23 of motor 18 above. The gear 22a on the shaft 15 of electric motor 18, has meshing engagement with the toothed collar 19 so as to rotate it. Gear 24 on shaft 22 of motor 20, has meshing engagement with rack 25, teeth on the bottom of rack 25 serving to rotate gears 26 upon the shafts 27 which will move the vanes or fins 28 simultaneously when motor 20 is operated.

A back-up system for engine 10, comprises a compressed air motor 29, the shaft 30 of which is secured fixedly to gear 31 which engages with the collar 19 for emergency rotation in the event of failure of the electric motor 18.

The back-up system for the vanes 28 includes compressed air motor 32, the shaft 33 of which is secured fixedly to gear 34 which engages a second rack 34a which engages gears 26a on the opposite ends of shafts 27 of vanes 28 from gears 26.

It shall be noted that the back-up compressed air motors 16, 29, and 32 are essential to the operation of engine 10 so as to prevent a possible disaster from occuring.

In use, the air craft when taking off, will have the gate valve 11 closed so that the jet blast is downwards and when the air craft reaches altitude, the gate valve 11 is opened by either the electric motor 17 or the compressed air motor 16, thus causing the jet stream to move rearward and thus urge the air craft forward by the thrust therefrom.

When the air craft is ready to land, the gate valve 11 is again closed by the heretofore mentioned means and the collar 19 and the fins 28 are activated for landing control.

While various changes may be made in the detail construction, it is understood that such changes will be within the spirit and scope of the present invention as is defined by the appended claims.

What I now claim is:

1. In a jet engine which comprises a nozzle including a passage therein for exhaust gases; a gate valve carried by said nozzle and adapted to close said passage; a tubular base portion connected to said nozzle forwardly of said gate valve and communicating with said passage; said base portion having a collar mounted thereon; said collar being rotatable and carrying a plurality of angularly adjustable vanes for selectively deflecting exhaust gases passing through said base portion; means operatively connected to said gate valve for opening and closing the same; means operatively connected to said collar for rotating the same; and means operatively connected to said vanes for adjusting the angle thereof, said means, in each instance, comprising both an electric motor and a compressed air motor, a separate electric motor and a separate compressed air motor being provided for each of said means.

2. The combination according to claim 1, wherein said vanes are carried by shafts having gears thereon and said means for adjusting the angle of said vanes comprises racks engaging said gears and engaged by said electric motor and compressed air motor.

* * * * *